Colburn & Gould,
Journal Box.
Nº 79,900.    Patented July 14, 1868.
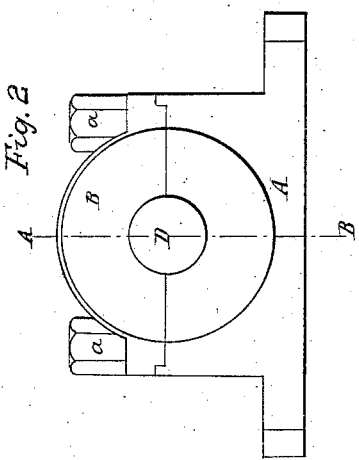
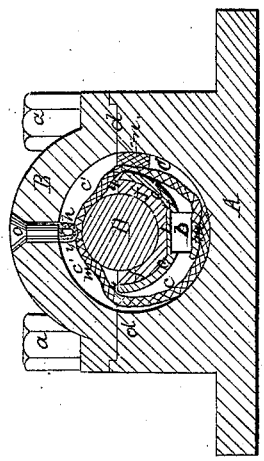
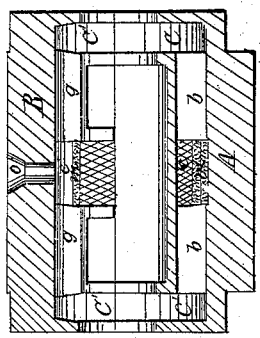
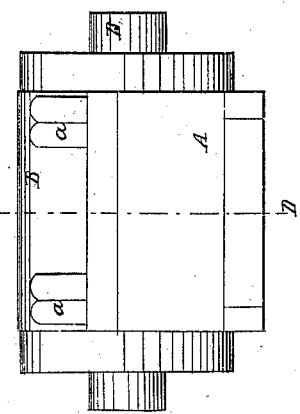
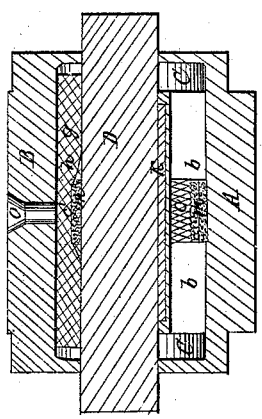
Witnesses
Geo Pratt
Lucius Brown.
Inventors
Richard Colburn
Geo W Gould

UNITED STATES PATENT OFFICE.

RICHARD COLBURN AND GEORGE W. GOULD, OF NORWICH, CONNECTICUT.

IMPROVED JOURNAL-BOX.

Specification forming part of Letters Patent No. 79,900, dated July 14, 1868.

*To all whom it may concern:*

Be it known that we, RICHARD COLBURN and GEORGE W. GOULD, both of Norwich, in the county of New London and State of Connecticut, have invented certain new and useful Improvements in Journal-Boxes; and we do hereby declare that the following is a full, clear, and exact description of the same, reference being had to the accompanying drawings, forming a part of this specification, in which—

Figure 1 represents a side view of our improved journal-box. Fig. 2 represents an end view of the same. Fig. 3 represents a longitudinal central section on line A B, Fig. 2. Fig. 4 represents a cross-section on line C D, Fig. 1; and Fig. 5 represents a longitudinal central section of a journal-box made in a modified form.

To enable those skilled in the art to which our invention belongs to make and use the same, we will proceed to describe it more in detail.

In the drawings, the bottom half of the box is lettered A and the upper half or cap B. The cap is retained in place in this instance by four set-screws or bolts, *a a a a*, two on each side. The lower half, A, of the box has a longitudinal groove or recess, *b*, cored out and reaching or extending from one end of groove C to the other, as fully indicated in Figs. 3 and 4 of the accompanying drawings. A cross groove or recess, *c*, is also cored out in the center of the bottom part of the box A, said groove or recess *c* extending from the top *d* of one side down and back of and under the metal part *e*, and thence up back of the metal part *e* to the top of the other side, as fully shown in Fig. 4. Cross groove or recess *c* intersects the longitudinal groove *b*, as shown in Figs. 3 and 4.

The Babbitt metal *f*, upon which the journal or shaft D rests and turns, is run into a recess formed or cored out in the face of the concave part of the lower half, A, of the box. (See Figs. 3 and 4.)

When the box is long it is quite inconvenient to core out the groove or recess *b*, and we adopt the plan of casting the box with the groove or recess *b* extending entirely through the concave of the part A, whereby the said groove or recess can be formed by drawing, the same as the concave is formed to receive shaft or journal D. Before the Babbitt metal is run in a thin piece of metal, 1, is fitted to close the top of the recess *b*, side grooves, 2 2, being formed to receive the plate 1, as fully shown in Fig. 4.

The grooves 2 2 may be formed in the pattern, so that they will only require to be planed or smoothed out slightly to receive the plates 1. After plate 1 has been inserted the Babbitt metal *f* is run in on top of plate 1. (See Figs. 3 and 4.)

By adopting the above-described mode of making the lower half of the box we are enabled to form the longitudinal groove or recess *b* with as much ease and convenience as the concave part for shaft D is formed. The upper half, B, of the box is cast with a longitudinal groove or recess, *g*, and a cross-groove, *c'*. The latter groove is made to correspond with the groove or recess *c* in the lower half of the box. The ends of the cap B are provided with end grooves C' C' to correspond with the end grooves C C of the lower half, A.

Within the longitudinal groove *g* is placed a wick or some proper fibrous material, *h*, while another wick, *m*, is passed around in the cross grooves or recesses *c c'*, as indicated in the drawings.

It will be noticed that the wick *m* rests upon the top of the shaft, and, further, that it communicates with the wick in the groove *g* in the cap B. A narrow wedge or block, *n*, is inserted in the groove *c* for the purpose of preventing the wick *m* from being moved out of place by the motion of the shaft D.

The operation is as follows: Oil or some proper lubricating substance is turned into the oil-hole *o* until the wicks *h* and *m* become saturated and the groove *b* becomes partially filled with oil. As the shaft revolves it will be oiled or lubricated by the wicks *m* and *g*, the wick *m* taking the oil from the chamber or groove *c*, while the wick *h* absorbs or takes it from wick *m* and conducts it longitudinally, so that the entire bearing part of the shaft is constantly and evenly lubricated so long as any oil remains in the chamber *b*. In case a surplus of oil is conveyed to the shaft by the wicks, it runs laterally in the grooves 4 4 and descends through the end spaces or grooves C C' into the chamber or groove *b*, to be again taken up or absorbed by the wicks and conveyed to lubricate the shaft or the wearing or bearing part thereof, as before explained.

In the drawings, the ends of the wick *m* are shown lapped at the bottom or at the point where the grooves $b$ and $c$ intersect each other. If preferred, the ends may be lapped above the shaft D, or the ends of the wick may be sewed or otherwise fastened together.

In case it is desired to change wick $m$, it is only necessary to remove cap B, when the wick can be withdrawn and a new one substituted; and this operation can be performed without stopping the shaft.

In Fig. 5 a longitudinal central section of a box is shown, in which the concave part $e$, above the groove $b$, is cast whole. In this figure the Babbitt metal $f$ and wick $h$ are left out for the purpose of showing the chambers, recesses, or grooves in which they are placed more fully.

Our journal-box has been tested by some of the most reliable and competent mechanics and machinists in New England, and has been pronounced one of the best and most desirable self-lubricating journal-boxes which has been invented.

The box may be used to good advantage with a single wick, $m$, and, if preferred, the Babbitt metal may be grooved so as to force the oil laterally each way from the center.

Having described our improved journal-box, what we claim therein as new and of our invention, and desire to secure by Letters Patent, is—

1. The combination, with the bottom A and top B of the box, of the end grooves C C, longitudinal grooves $b$ $g$, cross-grooves $c$ $c$, and the wicks $m$ $h$, with or without grooves 4 4, substantially as and for the purposes set forth.

2. The combination, with the parts A and B, of the end grooves C C', longitudinal groove $b$, cross-grooves $c$ $c'$, and wick $m$, substantially as and for the purposes herein set forth.

3. The combination, with the metal part $e$ and groove $b$ of the box, of the groove-covering and Babbitt supporting plate 1, substantially as and for the purposes set forth.

RICHARD COLBURN.
GEO. W. GOULD.

Witnesses:
GEO. PRATT,
LUCIUS BROWN.